July 14, 1970   R. ASHTON ET AL   3,520,121
MULTI-ROW CORN HARVESTER

Filed Dec. 28, 1966   8 Sheets-Sheet 1

Fig. 1

INVENTORS
ROBERT ASHTON &
BY  JAMES G. BUTLER

Tweedale & Gerhardt
ATTORNEYS.

United States Patent Office 3,520,121
Patented July 14, 1970

---

3,520,121
MULTI-ROW CORN HARVESTER
Robert Ashton and James G. Butler, Islington, Ontario, Canada, assignors to Massey-Ferguson Industries Limited, Toronto, Ontario, Canada
Filed Dec. 28, 1966, Ser. No. 605,475
Int. Cl. A01d 45/02
U.S. Cl. 56—106                                    12 Claims

ABSTRACT OF THE DISCLOSURE

A combine header for harvesting corn (maize) in which a plurality of gathering and snapping units each having gathering chains and snapping rolls are supported side by side on a transverse tool bar or supporting beam and can be adjusted toward and away from each other to accommodate different corn row spacings.

BACKGROUND OF THE INVENTION

Field of the invention

This invention relates to devices for harvesting corn (maize) and similar row crops, and particularly to such devices having a plurality of harvesting units for snapping or removing ears from separate rows of corn stalks.

Description of the prior art

Corn harvesting headers for combines include those having a plurality of snapping and gathering units, one for each row of corn to be harvested, arranged side by side and spaced from each other in accordance with the spacing between corn rows. Until recently, the snapping and gathering units of such machines were installed on the harvesting header at a fixed spacing, and were required to be completely removed and remounted on the header in order to convert the machine for harvesting in corn fields having row widths different from the original spacing between the snapping and gathering units. U.S. Pat. No. 3,271,940, of Robert Ashton, M. Leroy Gullickson, and James G. Butler, dated Sept. 13, 1966, discloses a multi-row corn harvester in which the gathering and snapping units can be adjusted toward and away from each other without removal and remounting of the units. Adjustment of the gathering and snapping units of the machine disclosed in the aforesaid Ashton et al. patent is accomplished by loosening the mechanism clamping the gathering and snapping units to a supporting beam or tool bar, and thereafter, changing the length of the various drive shafts between the adjacent gathering units in accordance with the new spacing between the units.

U.S. Pat. No. 1,390,159 dated Sept. 6, 1921 discloses an attachment having a plurality of gathering chains adjustable toward and away from each other along a common drive shaft. Each gathering chain is individually connected with the drive shaft such that the spacing between cooperating pairs of the chains must be separately adjusted. Moreover, the gathering chain units have a large portion of their weight supported on the drive shaft and must therefore be of extremely lightweight construction.

SUMMARY OF THE INVENTION

In accordance with the present invention, gathering and snapping units each including cooperating pairs of gathering chains and snapping rolls are mounted on a transverse supporting beam or tool bar, and are each provided with transmission units having drive gears for driving the snapping rolls and gathering chains. Transverse snapping roll and gathering chain drive shafts are slideably and non-rotatably connected with the drive gears such that the gathering and snapping units can be adjusted toward and away from each other along the tool bar and drive shafts without disconnecting the drive.

DESCRIPTION OF THE PREFERRED EMBODIMENT

Figure 1:
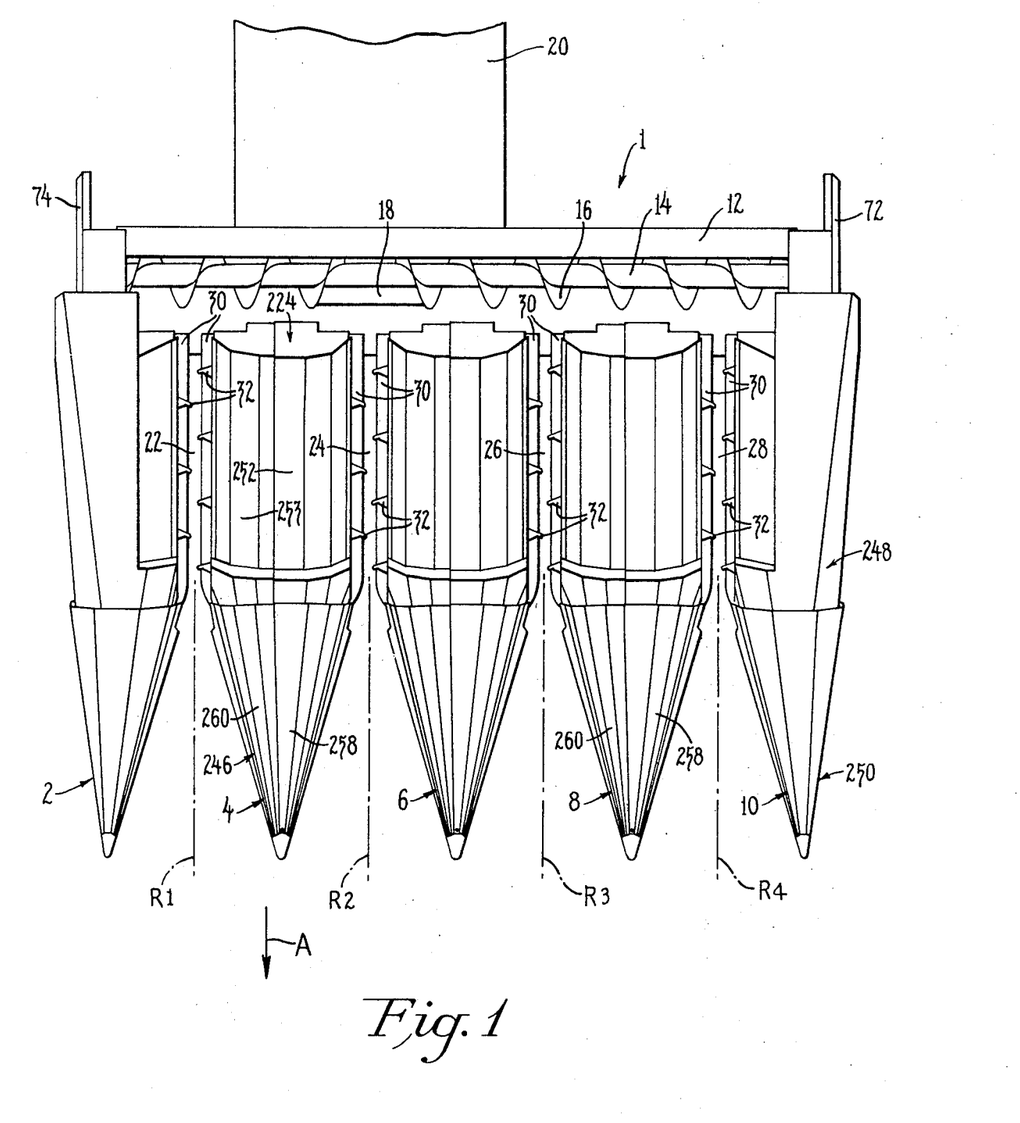
FIG. 1 is a plan view of a corn harvesting header embodying the invention.

In FIG. 1, reference numeral 1 collectively designates a combine corn harvesting header including a plurality of hood and snout assemblies 2, 4, 6, 8 and 10 projecting from a main supporting frame in the form of a conventional harvesting table 12 having a trough for an auger conveyor 14. Harvested crop material deposited onto the table 12 is engaged by the opposed screw flights 16 of the auger and conveyed to the inlet of an elevator 20 where it is fed into the elevator by transverse blades or paddles 18.

Figure 4:
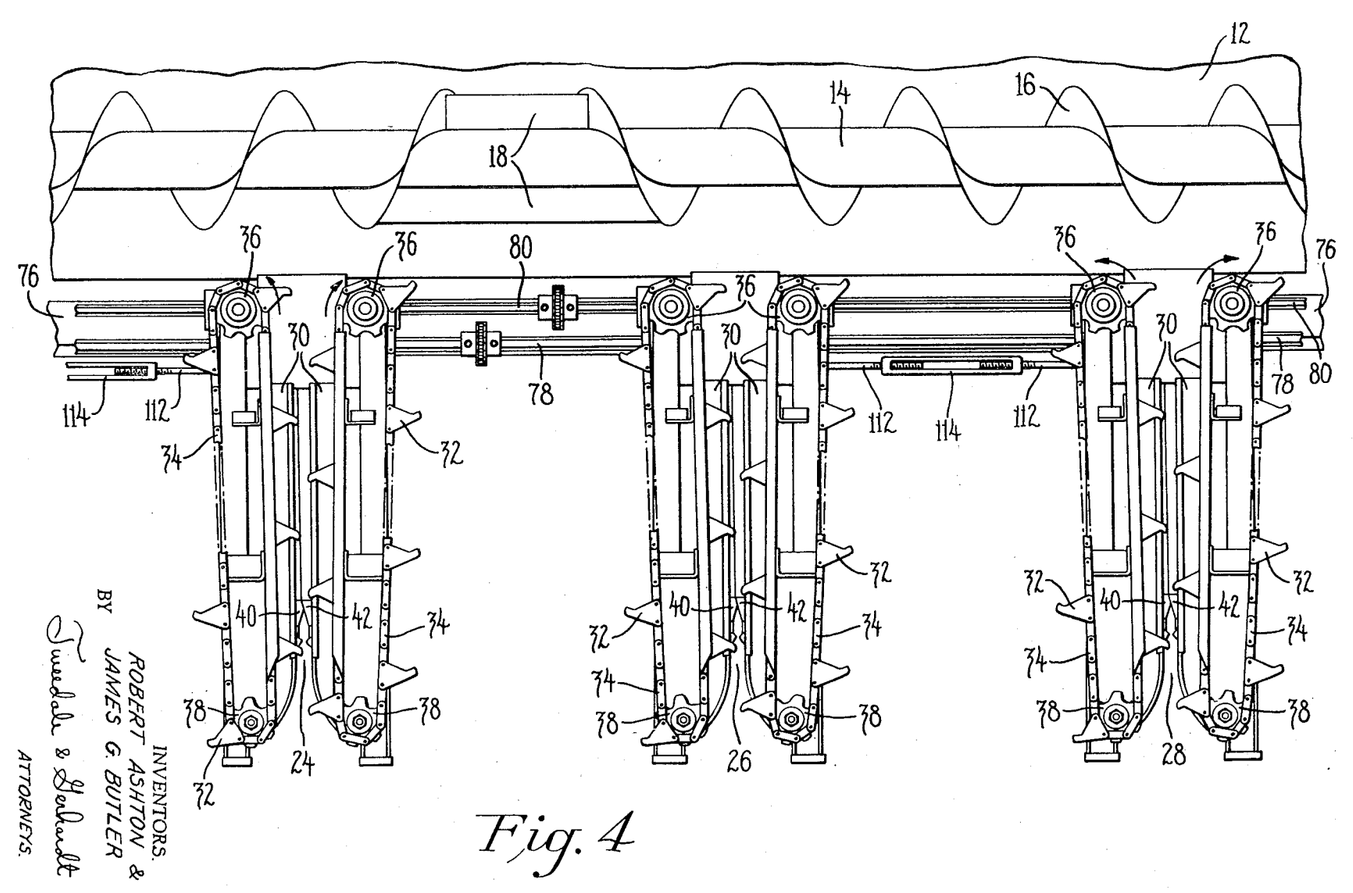
FIG. 4 is an enlarged view similar to FIG. 1 with the hood and snout covers removed to illustrate the gathering and snapping units.

Defined between the adjacent hood and snout assemblies 2–4, 4–6, 6–8, and 8–10 respectively, are snapping slots 22, 24, 26, and 28. The snapping slots are defined by the space between pairs of stripper plates 30. Overlying the stripper plates are rearwardly moving fingers 32 of gathering chains 34 (FIG. 4). The illustrated corn harvesting attachment is capable of simultaneously harvesting four rows of corn, the corn rows being designated in FIG. 1 as R1, R2, R3 and R4. As the combine advances in the direction of arrow A in FIG. 1, the stalks are engaged by the gathering chain fingers 32 and pulled rearwardly into the snapping slots 22, 24, 26 and 28 where they are brought into engagement with a pair of opposed snapping rolls 40, 42 (FIG. 4). The snapping rolls pull the corn stalks through the snapping slots, and the ears are removed from the stalks as they come into engagement with the stripper plates 30, the ears being larger than the snapping slots. The removed ears are then carried rearwardly by the gathering chain fingers 32 and deposited onto the trough of table 12 and carried to the elevator by auger 14.

Each gathering chain 34 is mounted on a rear sprocket 36 and a front sprocket 38 (FIGS. 4, 5, 6) so as to overlie the stripper plates 30. Sprockets 36 and 38, as well as each pair of snapping rolls 40, 42 are mounted on a frame 46 having a pair of forwardly extending side frame members 48 and 50. The sinapping rolls 40 and 42 are each provided with blades 44 and are mounted on frame 46 beneath the stripper plates 30 to rotate in opposite directions as indicated by the arrows in FIG. 3.

Figure 8:
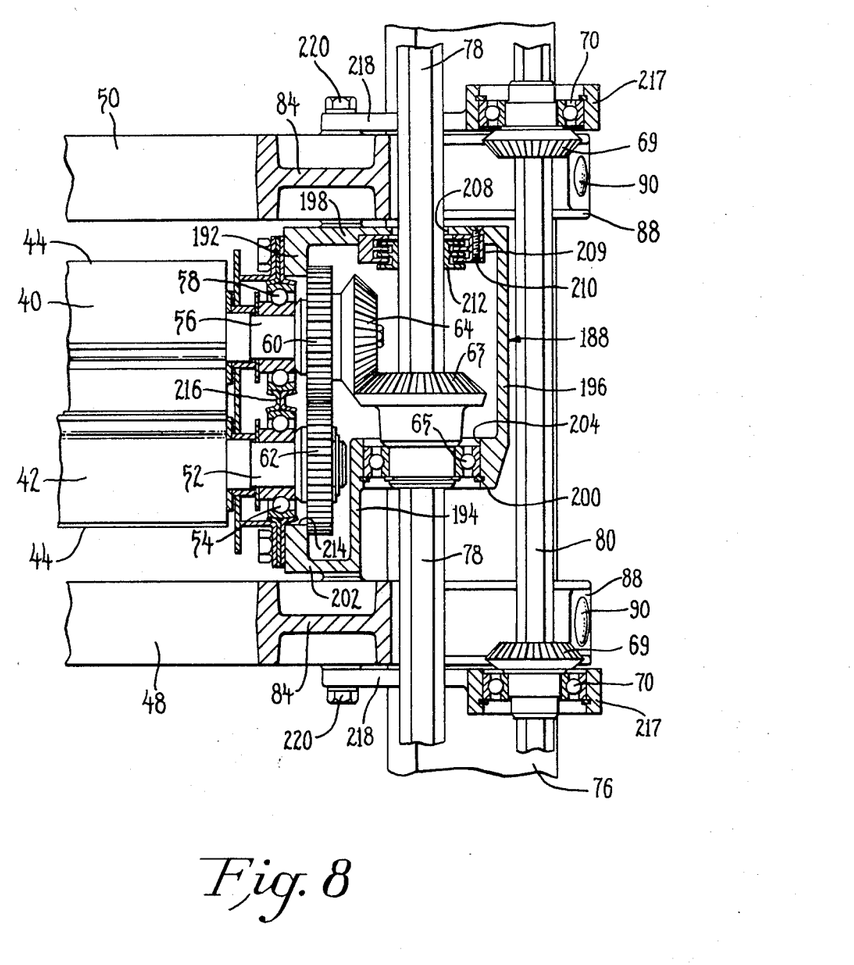

With reference to FIG. 8, a shaft 52 projects from the rear of snapping roll 42 and is rotatably supported in a bearing assembly 54. Snapping roll 40 similarly has a shaft 56 rotatably supported in a bearing assembly 58. Pinion gears 60 and 62 are fixed to the ends of shafts 56 and 52, respectively. Gears 60 and 62 are engaged with each other such that rotation of snapping roll 40 causes rotation of snapping roll 42 in the opposite direction. As shown in FIG. 8, each gathering and snapping unit is provided with transmission means for the gathering chains and snapping rolls, the transmission means having driving members in the form of bevel gears 63 and 69 carried by the gathering and snapping unit, engaged by driven members in the form of bevel gears 64 and 68 (FIG. 6), respectively. Bevel gear 64 is fixed to the end of shaft 56 and is engaged with the bevel drive gear 63 which in turn is rotatably supported in a bearing assembly 65 and secured against axial displacement relative to the gathering and snapping unit frame.

Figures 5, 6, 7:
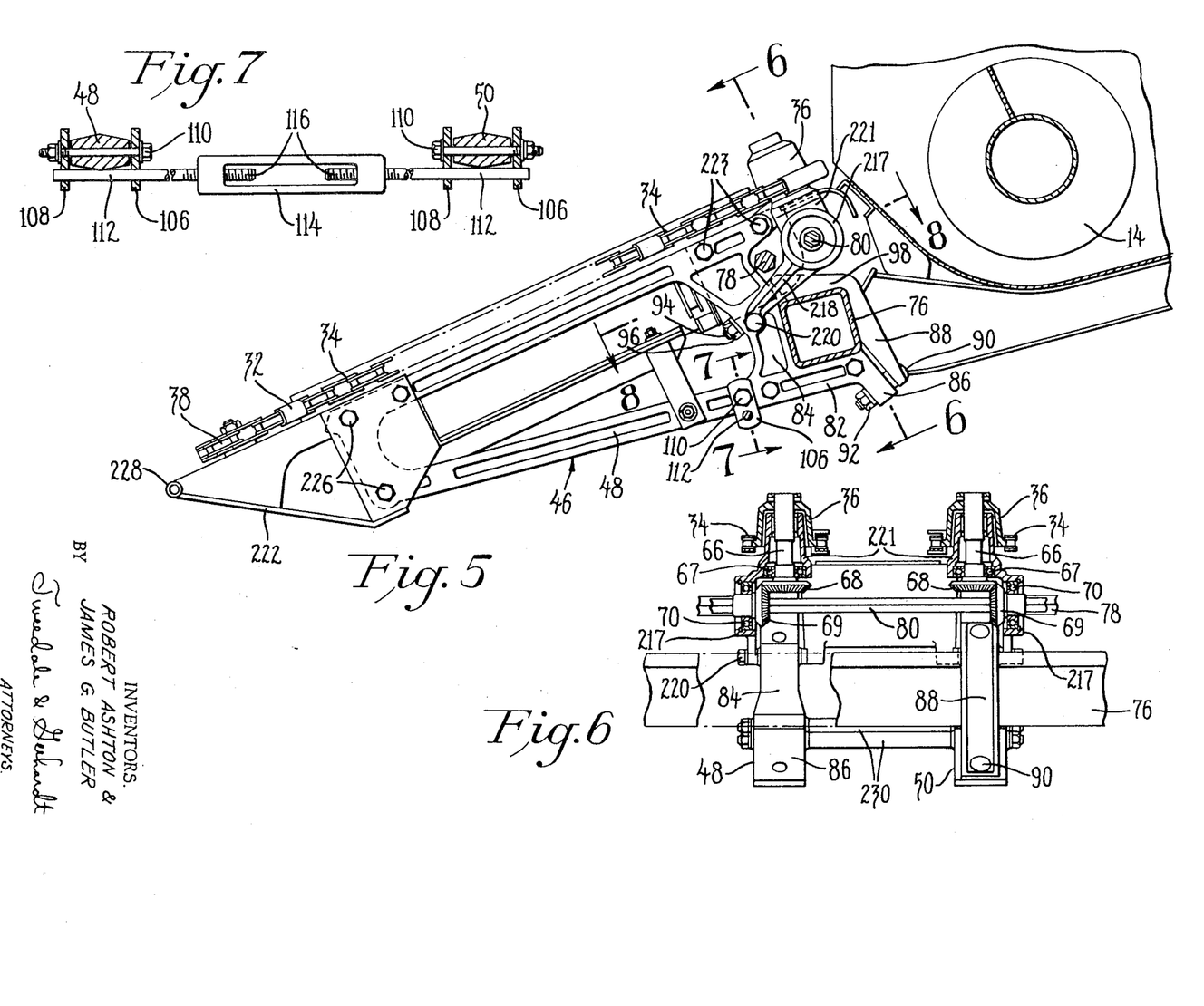
FIG. 5 is an elevational view of a gathering and snapping unit.
FIGS. 6, 7 and 8 are sectional views taken on lines 6—6, 7—7, and 8—8, respectively, of FIG. 5.

The rear gathering chain sprocket 36 is of inverted cup-shaped configuration as shown in FIG. 6, and is mounted on a shaft 66 rotatably supported in a bearing assembly 67. Fixed to the lower end of shaft 66 is a bevel gear 68 engaged with bevel drive gear 69. Gear 69 is rotatably supported in a bearing assembly 70. Rotation of drive gear 69 thus transmits rotation through gear 68 to the gathering chains which are driven in the direction of the arrows shown in FIG. 4.

Mounted along the forward edge of the table 12 between the side members 72 and 74 (FIG. 1) is a transverse supporting beam or tool bar 76, as well as a snapping roll drive shaft 78 and a gathering chain drive shaft 80. The snapping roll drive shaft 78 is of non-circular cross section and is received in the non-circular axial opening of gear 63 such that it is slideably and non-rotatably engaged by the snapping roll drive gear 63. Similarly, the gathering chain drive shaft 80 is of non-circular configuration and is slideably received in the non-circular axial openings in gears 69 such that it is non-rotatably engaged by the gathering chain drive gears 69. Gears 63 and 69 are axially fixed in their respective bearing assemblies 65 and 70 and the entire snapping and gathering units are therefore movable along the axes of shafts 78 and 80.

With reference primarily to FIG. 5, each of the gathering and snapping units is secured to the support member 76 by mounting means including rearwardly projecting extensions 82 and upright members 84 formed on side frame members 48 and 50 of each frame 46, and a cooperable clamping member 88. Extensions 82 and upright members 84 engage the bottom and forward edges, respectively, of tool bar 76. A downwardly and rearwardly projecting clamping flange 86 is formed on extension 82, and clamping member 88 is secured at its lower end to flange 86 by a bolt 90 and nut 92. Clamping member 88 engages the rear side of tool bar 76 and is formed with an upper arm portion 98 which engages the upper side of the tool bar 76. The arm portion 98 is secured to the upright member 84 by a bolt and nut assembly 94, 96, which, in cooperation with the bolt and nut assembly 90, 92 secures the gathering and snapping units to the tool bars 76. Therefore, by loosening nut 92, the entire gathering and snapping unit can be shifted along the axes of tool bar 76, snapping roll drive shaft 78, and gathering chain drive shaft 80.

Mechanical, hydraulic or other power means may be provided for shifting the gathering and snapping units toward and away from each other along tool bar 76. In the illustrated embodiment, the power means is in the form of a mechanical adjustment assembly illustrated in detail in FIGS. 5 and 7. Mounted on the side of the lower frame member of side frame member 48 and 50 is a pair of plates 106 and 108. Plates 106 and 108 are secured to the frame member by a bolt 110. Welded or otherwise secured to plates 106 and 108 is a rod 112 having a threaded end 116 engaged with a turnbuckle 114. The turnbuckle 114 is mounted on the opposed threaded ends 116 of the adjacent rods 112 such that by rotating the turnbuckle in one direction the adjacent pairs of gathering and snapping units are drawn toward each other, and rotation of the turnbuckle in the opposite direction causes the units to move away from each other along the tool bar 76.

Figure 11:
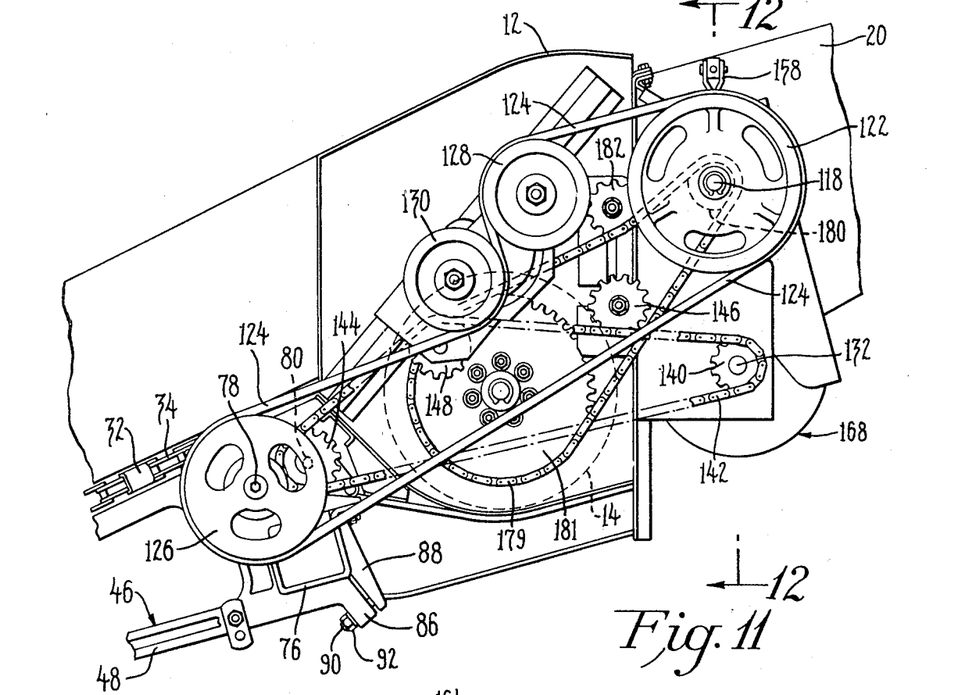
FIG. 11 is an enlarged elevational view of the main drive for the header.
Figure 12:
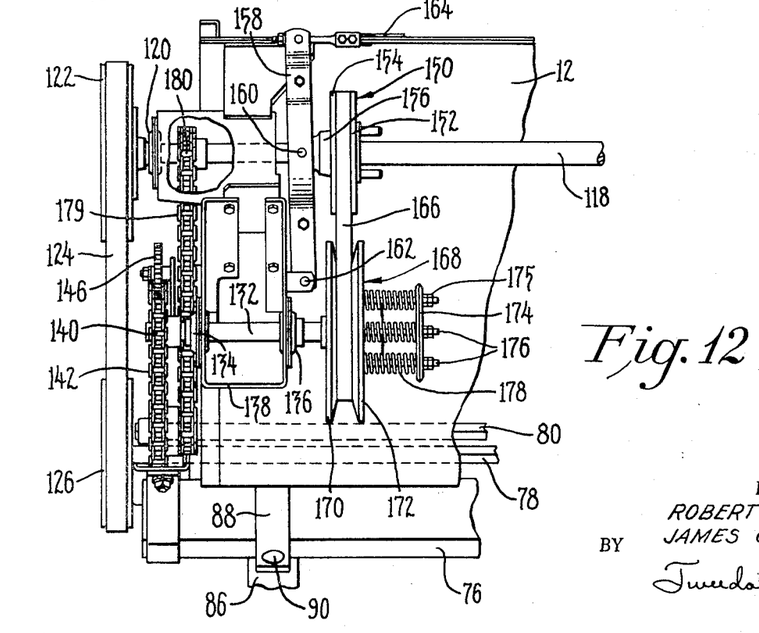
FIG. 12 is a sectional view taken on line 12—12 of FIG. 11.
Figure 13:
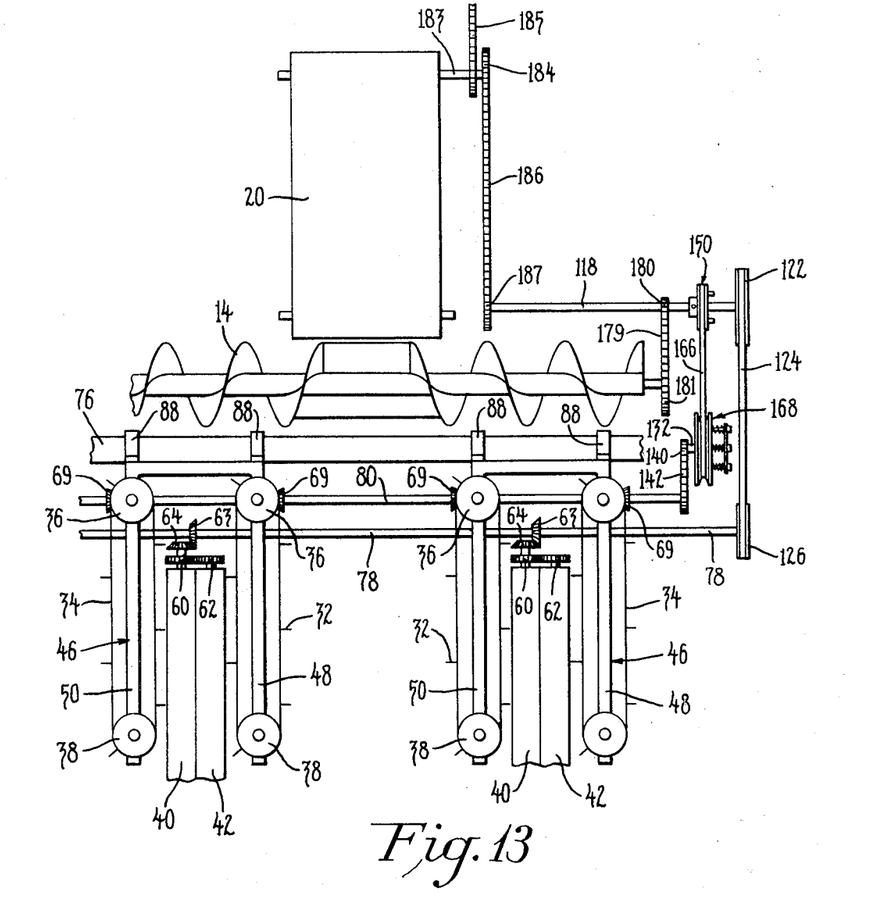
FIG. 13 is a diagrammatic plan view of the mounting and drive arrangement.

With reference to FIGS. 11, 12 and 13, a power shaft 118 extends transversely along the rear wall of table 12 and has one end rotatably supported in a bearing assembly 120. Fixed to the end of shaft 118 is a pulley 122 for a V-belt 124, the other end of which is supported on a pulley 126 fixed to the end of the snapping roll drive shaft 78. Idler pulleys 128 and 130 support the V-belt 124 between pulleys 122 and 126. Idler pulleys 128 and 130 are adjustable to vary the tension on the V-belt 124.

Mounted beneath shaft 118 on the rear wall of table 12 is a shaft 132 which is rotatably supported in bearings 134 and 136 carried by a support bracket or frame 138 secured to the rear wall of table 12. Fixed to the outer end of shaft 132 is a sprocket 140 which supports one end of a chain 142, the other end of which is supported on a sprocket 144 fixed to the end of the gathering chain drive shaft 80. The chain 142 is supported between sprockets 140 and 144 by an idler sprocket 148. A tension idler sprocket 146 also engages the upper run of chain 142. Thus, rotation of shaft 132 is transmitted to the gathering chains through chain 142.

Non-rotatably mounted on power shaft 118 is a variable speed pulley 150 having a fixed portion 152 secured to shaft 118 against axial movement, and a movable portion 154 slideably supported on shaft 118. Pivotally connected at 160 to the hub 156 of the movable portion 154 is a lever 158 having its lower end pivotally secured at 162 to the bearing frame 138, and its upper end connected with a control cable or wire 164. Clockwise rotation of lever 158 about pivot 162 causes the movable portion 154 to move toward the fixed portion 152 of the variable speed pulley 150 to thereby increase the effective diameter of pulley 150, and conversely, counterclockwise movement of lever 158 (FIG. 12) moves the movable portion 154 away from the fixed portion 152 to decrease the effective diameter of the pulley. Power is transmitted from shaft 118 to shaft 132 by a belt 166 supported on pulley 150 and a split pulley 168 mounted on shaft 132. Pulley 168 has a portion 170 fixed against axial movement relative to shaft 132, and a movable portion 172 which is axially slideable relative to shaft 132. The movable portion 172 is slideably supported on rods 176 projecting from the fixed portion 170, and a spring plate 174 is carried by rods 176 and is biased into engagement with nuts 175 on the ends of rods 176 by springs 178. Consequently, an increase or decrease in the effective diameter of the pulley 150 causes a corresponding decrease or increase, respectively, in the effective diameter of the pulley 168.

The auger 14 is driven from shaft 118 through a sprocket 180 on shaft 118, a chain 179, and a sprocket 181 on the end of the auger. Chain 179 is also engaged with an idler sprocket 182.

Figures 2, 3:
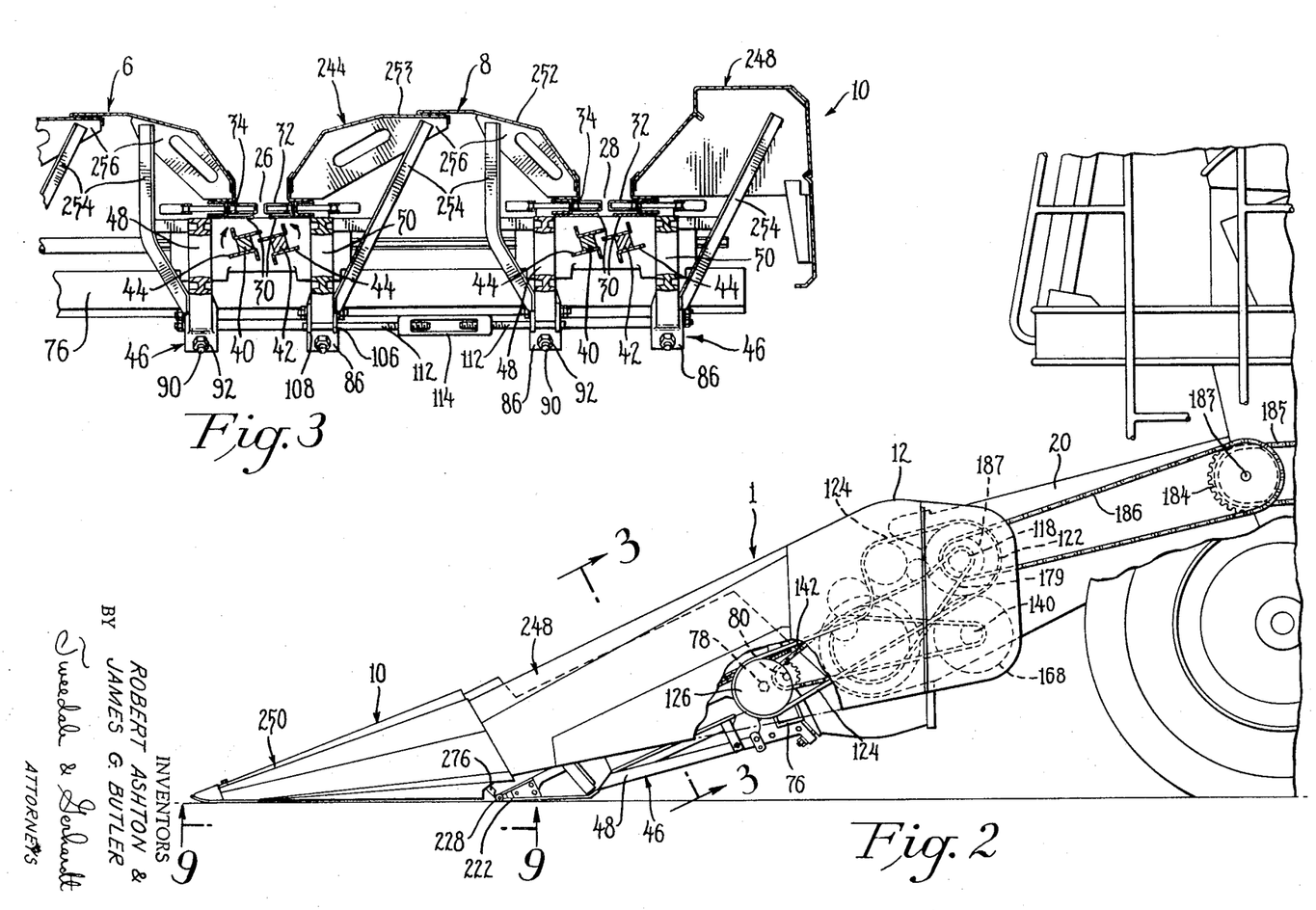
FIG. 2 is an elevational view of the corn harvesting header of FIG. 1.
FIG. 3 is a sectional view taken on line 3—3 of FIG. 2.

With reference to FIG. 2, the elevator 20 is mounted on the main body of the combine for pivotal movement about the axis of a shaft 183. Shaft 183 is driven from the combine engine through a chain 185 and transmits power to the power shaft 118 through a chain 186 mounted on a sprocket 184 on shaft 183 and a sprocket 187 on shaft 118. Cable 164 (FIG. 12) is accessible at the operator's platform of the combine such that the operator can change the speed of the gathering chains relative to the speed of power shaft 118 while the combine is moving. If a rock or other foreign object should encounter any one set of the snapping rolls 40, 42, causing the rolls to jam, the snapping roll shaft 78 will stop rotating and the V-belt 124 will slip on pulley 126. Similarly, jamming of any one set of the gathering chains will cause shaft 80 to stop which in turn will cause shaft 132 to stop rotating and belt 166 will slip on the split pulley 168. Therefore, all of the gathering and snapping units are protected by a single slip drive arrangement thus eliminating the requirement for multiple slip clutches. Moreover, the speed of the gathering chains relative to the ground speed of the combine can be adjusted "on the go" or during operation by the operator through lever 158 and cable 164.

Figure 10:
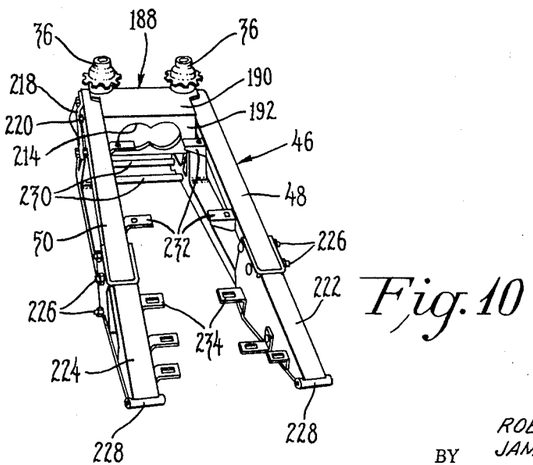
FIG. 10 is a perspective view of the frame for the gathering and snapping units.

With reference primarily to FIGS. 8 and 10, a gear housing portion 188 for the snapping roll and gathering chain transmission is mounted between the rear ends of side frame members 48 and 50 of the gathering and snapping unit frame 46. The gear housing portion 188 has a cover plate 190, a front wall 192, an intermediate transverse wall 194, and a rear transverse wall 196. A side wall 198 extends between wall 192 and 196 (FIG. 8) and side walls 200 and 202 extend between walls 194, 196 and between walls 192, and 194, respectively. Bearing assembly 65 is mounted in an opening 204 formed in wall 200 and is secured against axial movement relative thereto. Wall 198 is formed with an opening 208 for passage of the snapping roll shaft 78, and a labyrinth seal member 212 is mounted on the shaft and cooperates with a portion 209 secured to wall 198 by screws 210. The seal 209, 212 protects the gears 60, 62, 64 and 63 from dust and foreign matter. A pair of overlapping circular openings 214 is provided in the front wall 192 for a bearing support assembly 216 for bearings 54 and 58 of the snapping rolls.

Bearing assemblies 70 for the gathering chain shaft 80 are mounted in bearing housings 217 each having an arm 218 secured to the side frame member by bolts 220, and are integral with a housing 221 for bearing assemblies 67 of the gathering chain sprocket shaft 66 (FIG. 6). Housing portions 221 are secured to the frame by bolts 223 (FIG. 5).

Mounted on the forward ends of side frame members 48 and 50 of frame 46 (FIG. 10) are skid members 222 and 224, respectively, which are of identical construction except that one is the mirror image of the other. Skid member 222 is secured to the side frame member 48 by bolts 226 and is formed at its forward end with a hinge member 228. Extending between the lower portions of side frame members 48 and 50 forward of the gear housing portion 188 is a pair of connecting rods 230. Stripper plate support members 232 are mounted on the inner sides of the side frame members as shown in FIG. 10, and support members 234 are mounted on the inner sides of skid members 222 and 224 for supporting bearing assemblies for the forward ends of the snapping rolls.

With reference to FIG. 1, the hood and snout assemblies 4, 6 and 8 include hoods 244 and snouts 246, respectively, and the hood and snout assemblies 2 and 10 include hoods 248 and snouts 250. The hood assemblies 244 include panels 252 and 253, which as shown more clearly in FIG. 9, have overlapping edges so that they can be moved laterally relative to each other to increase or decrease the width of the hood assemblies upon adjustment of the gathering and snapping units toward and away from each other. The hood panels are secured to the adjacent snapping and gathering units by brace members 254 extending between the side frame members 50, 48 and a frame member 256 for each hood panel (FIG. 3).

Figure 9:
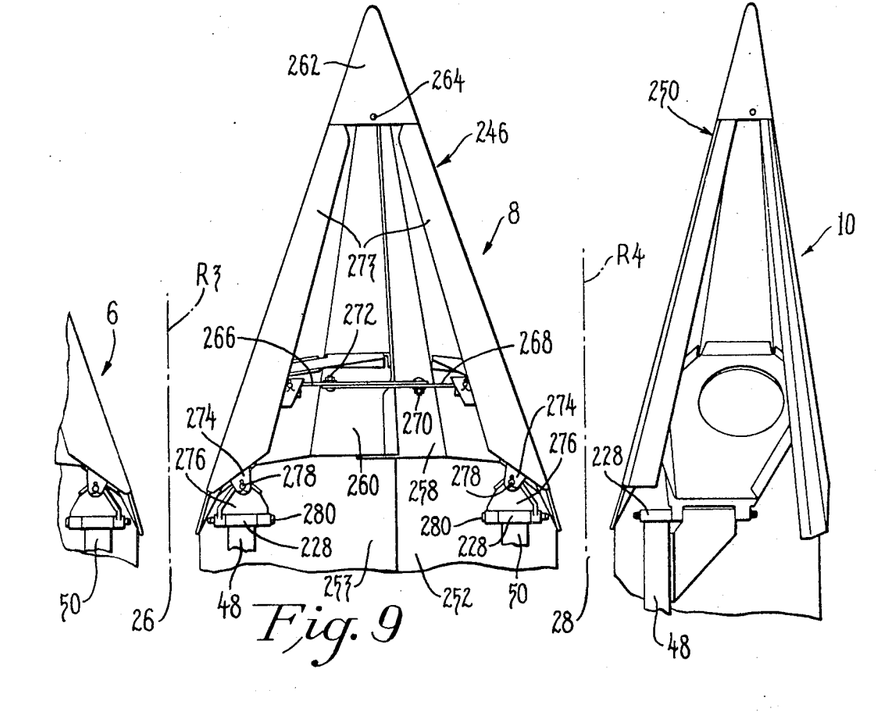
FIG. 9 is a bottom plan view taken on line 9—9 of FIG. 2.

The snout assemblies 246 include panels 258 and 260 which overlap in a manner similar to the panels of the hood assemblies and are pivotally secured at 264 to a conical point 262 (FIG. 9). Overlapping plates 266 and 268 extend between the snout panels 258 and 260 and are slotted to receive fasteners 270 and 272. Movement of the associated pairs of gathering units toward and away from each other causes the snout panels to increase or decrease the width of the snouts by pivoting around pivot 264. As shown in FIG. 9, the snout panels are each formed with horizontal flanges 273 on their lower sides, at the rear portions of which are secured brackets 274 for pivotally supporting hinge members 276 by pins 278. A hinge pin 280 connects each hinge bracket 276 with the hinge member 228 at the ends of the side frame members of the gathering and snapping unit.

OPERATION

Referring again to FIG. 1, and assuming that the gathering and snapping units are adjusted to the proper row widths, as the machine advances through rows R1, R2, R3, R4, the stalks are guided by the snouts into the snapping slots 22, 24, 26, and 28 where they are engaged by the fingers 32 of the gathering chains and pulled rearwardly into engagement with the snapping rolls. The oppositely rotating snapping rolls pull the stalks downwardly through the stripping slot and the ears are snapped off as they come into contact with the stripper plates. The gathering chain fingers 32 then carry the removed ears rearwardly and deposit them into the auger trough. During the harvesting operation, the operator can shift lever 158 (FIG. 12) by actuating the control wire or cable 164 to increase or decrease the speed of the gathering chains as desired. In the event that either the gathering chains or snapping rolls of one of the units is jammed, belts 124 or 166 will slip and prevent damage to the drive mechanism.

If the machine is then moved to a field having a different spacing between the corn rows, the units 4 and 8 of the header illustrated in FIG. 1 can be shifted toward or away from unit 6 to correspondingly increase or decrease the spacing between snapping slots 22 and 24 and between snapping slots 26 and 28. The adjustment can be accomplished by loosening nuts 92 and operating turnbuckle 114.

While a specific embodiment of the invention has been illustrated and described in the foregoing specification and drawings, it will be apparent to those skilled in the art that various alterations and modifications in the construction and arrangement of parts is possible without departing from the scope and spirit of the invention.

We claim:

1. A corn harvesting header for simultaneously harvesting a plurality of spaced rows of corn comprising: main frame means, a laterally extending support carried by said main frame means, drive shaft means rotatably supported on said main frame means in parallel relationship with said support, a plurality of gathering and snapping units each having gathering chains and snapping rolls, mounting means for each of said gathering and snapping units securing the gathering and snapping units to said support such that the weight of said gathering and snapping units is supported on said support, the mounting means for at least one of said gathering and snapping units being selectively releasable to permit said one gathering and snapping unit to be moved along the support to vary the spacing between said one gathering and snapping unit and an adjacent gathering and snapping unit, gathering chain and snapping roll transmission means on each of said gathering and snapping units drivingly engaged with said drive shaft means for transmitting drive to the gathering chains and snapping rolls upon rotation of said drive shaft means, the transmission means for at least said one gathering and snapping unit being slideable relative to said drive shaft means to permit said one gathering and snapping unit to be moved along said support without interrupting the engagement of its transmission means with said drive shaft means, and power means connected between said one gathering and snapping unit and an adjacent gathering and snapping unit for moving said one gathering and snapping unit toward and away from adjacent gathering and snapping unit along said support when the mounting means for said one gathering and snapping units is released.

2. A corn harvesting header as claimed in claim 1 wherein said power means comprises a turnbuckle connected between the adjacent gathering and snapping units.

3. A corn harvester comprising: a transverse harvesting table; a transverse supporting beam carried by the harvesting table; a plurality of forwardly projecting gathering and snapping units mounted on said beam in laterally spaced relationship, each of said gathering and snapping units including a frame, a pair of cooperable gathering chains mounted on said frame, a pair of cooperable snapping rolls mounted on said frame beneath said gathering chains, and transmission means for said gathering chains and snapping rolls carried by said frame; a pair of transverse non-circular drive shafts, one of which is a snapping roll drive shaft and the other is a gathering chain drive shaft rotatably mounted on said harvesting table in parallel relationship with said beam; said drive shafts being slideably and drivingly engaged with the transmission means of each of said gathering and snapping units for simultaneously driving all of the gathering chains and snapping rolls; at least one of said gathering and snapping units being mounted on said beam by clamping means releasable to permit selective adjustment of said one gathering and snapping unit along said beam and drive shafts without interrupting the driving engagement of said one gathering and snapping unit with said drive shafts to vary the lateral spacing between said one gathering and snapping unit and adjacent gathering and snapping units; a gathering chain driving member and a gathering chain driven member each rotatably mounted on said frame, said gathering chain driven member being drivingly connected with the gathering chain driving member and the gathering chains; a snapping roll driving member and a snapping roll driven member, said snapping roll driven member, being drivingly connected with the snapping roll driving member and the snapping roll; said gathering chain drive shaft and said snapping roll drive shaft slideably and non-rotatably engaged with said gathering chain and snapping roll driving members; said gathering chain and snapping roll driving members each having non-circular axial openings complementary to the gathering chain and snapping roll drive shafts, respectively, and said gathering chain and snapping roll drive shafts being received respectively in the axial openings of the gathering chain and snapping roll driving members; power transmission means on said table including a power shaft rotatably mounted on the table, means drivingly connecting the power shaft with the snapping roll drive shaft, a secondary shaft, means drivingly connecting the secondary shaft with the gathering chain drive shaft, and means drivingly connecting the secondary shaft with the power shaft; and wherein said means drivingly connecting the power shaft and secondary shaft includes speed change mechanism for selectively varying the speed of the secondary shaft relative to the power shaft to thereby selectively vary the speed of the gathering chains.

4. A corn harvester as claimed in claim 3 wherein said means drivingly connecting the power shaft with the snapping roll drive shaft and said means drivingly connecting the secondary shaft with the power shaft permit slippage between the power shaft and snapping roll drive shaft and between the power shaft and secondary shaft, respectively, when the snapping rolls and gathering chains are jammed.

5. Corn harvesting apparatus including a gathering and snapping unit having a frame with a pair of laterally spaced, forwardly projecting side frame members; a ground engaging skid member secured to the forward end of each side frame member, a closed gear housing carried by said frame between said side frame members near the rear ends thereof, said closed gear housing having front and rear transverse walls joined by side walls and a cover plate; a snapping roll driving gear rotatably supported in one of the side walls; a pair of rotatable snapping rolls mounted on said frames between said side frame members, each of said snapping rolls having shafts rotatably supported in the front wall of said closed gear housing; a snapping roll driven gear carried by the shaft of one of said snapping rolls engaged with said driving gear within said closed gear housing; means within said housing drivingly connecting the shafts of said snapping rolls together such that rotation of said snapping roll driving gear causes simultaneous opposite rotation of said snapping rolls; a stripper plate supported on each of said side frame members above the snapping rolls, said stripper plates cooperating with each other to define a longitudinal snapping slot above the snapping rolls; a front and rear gathering chain sprocket on each of said side frame members; a gathering chain mounted on the front and rear sprocket of each side frame members above the snapping slot; a pair spaced, coaxial gathering chain driving gears rotatably mounted on said frame; and a gathering chain driven gear carried by each of said rear gathering chain sprockets engaged with one of the gathering chain driving gears to drive its associated gathering chain upon rotation of the gathering chain driving gear.

6. Corn harvesting apparatus as claimed in claim 5 wherein each of said side frame members includes an upright member at its rear end and a rearwardly projecting extension on the lower portion of the upright member.

7. Corn harvesting apparatus as claimed in claim 6 further including a transverse beam for supporting the gathering and snapping unit, said beam having front and lower surfaces engageable respectively with the upright members and rearwardly projecting extensions, and clamping member releasably secured to each of said upright members and extensions to secure the gathering and snapping unit to the beam.

8. Corn harvesting apparatus as claimed in claim 7 further including axial openings in each of said snapping roll and gathering chain driving gears, a snapping roll drive shaft received in the axial opening of the snapping roll driving gear and non-rotatably coupled thereto, and a gathering chain drive shaft received in the axial openings of the gathering chain driving gears and non-rotatably coupled thereto.

9. Corn harvesting apparatus as claimed in claim 8 further including a main frame, said beam being carried by the main frame, power transmission means on said main frame means comprising a power shaft rotatably mounted on the main frame, means drivingly connecting the power shaft with the snapping roll drive shaft, a secondary shaft, rotatably mounted on the main frame, and means drivingly connecting the secondary shaft with the power shaft and means drivingly connecting the secondary shaft with the gathering chain drive shaft.

10. Corn harvesting apparatus as claimed in claim 9 wherein said means drivingly connecting the secondary shaft with the power shaft includes speed change mechanism for adjusting the speed of the secondary shaft relative to the power shaft during rotation of the power shaft to selectively vary the speed of the gathering chains.

11. Corn harvesting apparatus including a gathering and snapping unit having a frame with a pair of laterally spaced, forwardly projecting side frame members; a ground engaging skid member secured to the forward end of each side frame member, a gear housing carried by said frame between said side frame members near the rear ends thereof, said gear housing having front and rear transverse walls joined by side walls and a cover plate; a snapping roll driving gear rotatably supported in one of the side walls; a pair of rotatable snapping rolls mounted on said frames between said side frame members, each of said snapping rolls having shafts rotatably supported in the front wall of said gear housing; a snapping roll driven gear carried by the shaft of one of said snapping rolls engaged with said driving gear within said gear housing; means within said housing drivingly connecting the shafts of said snapping rolls together such that rotation of said snapping roll driving gear causes simultaneous opposite rotation of said snapping rolls; a stripper plate supported on each of said side frame members above the snapping rolls, said stripper plates cooperating with each other to define a longitudinal snapping slot above the snapping rolls; a front and rear gathering chain sprocket on each of said side frame members; a gathering chain mounted on the front and rear sprocket of each side frame members above the snapping slot; a pair spaced, coaxial gathering chain driving gears rotatably supported by said frame, and a gathering chain driven gear carried by each of said rear gathering chain sprockets engaged with one of the gathering chain driving gears to transmit drive to its associated gathering chain upon rotation of the gathering chain driving gear; each of said side frame members includes an upright member at is rear end and a rearwardly projecting extension on the lower portion of the upright member; a transverse beam for supporting the gathering and snapping unit, said beam having front and lower surfaces engageable respectively with the upright members and rearwardly projecting extensions, and clamping member releasably secured to each of said upright members and extensions to secure the gathering and snapping unit to the beam; said snapping roll and gathering chain driving gears including axial openings, a snapping roll drive shaft received in the axial opening of the snapping roll driving gear and non-rotatably coupled thereto, and a gathering chain drive shaft received in the axial openings of the gathering chain driving gears and non-rotatably coupled thereto; said beam being carried by the main frame, power transmission means on said main frame means comprising a power shaft rotatably mounted on the main frame, means drivingly connecting the power shaft with the snapping roll drive shaft, a secondary shaft, rotatably mounted on the main frame, and means drivingly connecting the secondary shaft with the power shaft and means drivingly connecting the secondary shaft with the gathering chain drive shaft; said means drivingly connecting the secondary shaft with the power shaft includes speed change mechanism for adjusting the speed of the secondary shaft relative to the power shaft during rotation of the power shaft to selectively vary the speed of the gathering chains; and wherein said snapping roll and gathering chain driving gears are slideably engaged with the snapping roll drive shaft and gathering chain drive shaft, respectively, such that the gathering and snapping unit is selectively adjustable along the beam and drive shafts without interruption of the driving connection between the respective drive shafts and the snapping rolls and gathering chains.

12. Corn harvesting apparatus as claimed in claim 11 wherein the axial opening in each of said snapping roll and gathering chain drive gears is non-circular and the snapping roll and gathering chain drive shafts are of complementary non-circular cross section.

References Cited

UNITED STATES PATENTS

| | | | |
|---|---|---|---|
| 1,390,159 | 9/1921 | Price | 56—59 |
| 3,070,939 | 1/1963 | Schwartz | 56—18 |
| 3,271,940 | 9/1966 | Ashton et al. | 56—105 |

ROBERT E. PULFREY, Primary Examiner

S. C. PELLEGRINO, Assistant Examiner

U.S. Cl. X.R.

56—18